United States Patent [19]

Moriguchi et al.

[11] 3,932,585

[45] Jan. 13, 1976

[54] METHOD OF REMOVING NITROGEN OXIDES FROM PLANT EXHAUST

[75] Inventors: Sanseki Moriguchi; Hiroshi Abe; Kiyoshi Saito; Makoto Miyazawa, all of Yokohama, Japan

[73] Assignee: Nippon Kokan Kabushiki Kaisha, Tokyo, Japan

[22] Filed: Sept. 6, 1973

[21] Appl. No.: 394,680

[30] Foreign Application Priority Data
Sept. 12, 1972 Japan.............................. 47-91399

[52] U.S. Cl................................. 423/235; 423/351
[51] Int. Cl.².......................................... C01C 3/00
[58] Field of Search .......... 423/235, 242, 212, 547, 423/551, 400, 351

[56] References Cited
UNITED STATES PATENTS

| | | | |
|---|---|---|---|
| 1,986,889 | 1/1935 | Fulton................... | 423/547 |
| 2,021,936 | 11/1935 | Johnstone.............. | 423/242 |
| 2,095,074 | 10/1937 | Muus..................... | 423/547 |
| 3,761,570 | 9/1973 | Lowicki et al. ........ | 423/242 |
| 3,801,696 | 4/1974 | Mark..................... | 423/212 |
| 3,809,744 | 5/1974 | Von Semel.............. | 423/400 |
| 3,836,630 | 9/1974 | Noguchi et al. ........ | 423/242 |

FOREIGN PATENTS OR APPLICATIONS

| | | | |
|---|---|---|---|
| 1,454,723 | 9/1966 | France.................. | 423/235 |
| 4,224,650 | 2/1967 | Japan................... | 423/547 |
| 519,048 | 6/1929 | Germany................ | 423/547 |
| 30,363 | 4/1931 | Australia.............. | 423/547 |
| 1,028,706 | 1/1966 | United Kingdom....... | 423/547 |
| 123,397 | 8/1931 | Austria................ | 423/547 |

OTHER PUBLICATIONS

Industrial & Engineering Chemistry— Vol. 63 — June 1941 — Rate of Oxidation of Sulfate Ions by Oxygen — Fuller & Crist.

*Primary Examiner*—Oscar R. Vertiz
*Attorney, Agent, or Firm*—Flynn & Frishauf

[57] ABSTRACT

A method of removing a nitrogen oxide from an exhaust containing the same which comprises preparing an absorbent solution by adding divalent copper ions alone or a mixture of the divalent copper ions and divalent manganese ions to an acid aqueous solution containing sulfites or acid sulfites of ammonium, alkaline metals, or alkaline earth metals or a mixture of two or more of these compounds; and introducing the plant exhaust into the absorbent solution to carry out reaction between the sulfite radical of the absorbent solution and the nitrogen oxides contained in the exhaust to reduce the nitrogen oxides to nitrogen gas.

9 Claims, 3 Drawing Figures

METHOD OF REMOVING NITROGEN OXIDES FROM PLANT EXHAUST

This invention relates to a method of removing nitrogen oxides such as NO or $NO_2$ contained in exhaust discharged from, for example, chemical plants or burning apparatuses so as to render the exhaust harmless.

As used herein, the term "nitrogen oxides" is defined to mean NO, $NO_2$ and mixtures thereof. These nitrogen oxides are released in the form contained in exhaust from various chemical plants such as boiler firing furnaces, sintering plants of iron works, sulfuric acid plants using nitric acid, nitric acid plants and powder plants. Removal of the nitrogen oxides from the exhaust to make it harmless to plant and animal life has been considered an important problem awaiting an immediate solution from the standpoint of maintaining environmental safety.

To date, therefore, a large number of processes have been proposed for elimination of nitrogen oxides from plant exhaust. The known dry processes include, for example, the type which carries out the catalytic reduction of nitrogen oxides by gas phase reaction using various reducing agents and the type which effects the adsorption of nitrogen oxides to activated carbon.

Some wet processes already published consist in absorbing nitrogen oxides in an alkaline aqueous solution containing, for example, $NH_4^+$, $Na^+$, $K^+$, $Ca^{++}$ or $Mg^{++}$.

Further, known from old is a process of absorbing the nitrogen oxides of plant exhaust in an acid aqueous solution containing urea to render the exhaust harmless by reducing the nitrogen oxides to nitrogen gas. Also generally known is a process of absorbing nitrogen oxides for reducing in an aqueous solution containing sulfites or acid sulfites of alkaline metals or alkaline earth metals or a mixture of two or more of these compounds. However, the prior art processes of eliminating nitrogen oxides have many drawbacks and present difficulties in practical application.

Namely, the dry process which uses a catalyst or activated carbon requires the dust of plant exhaust and catalyst-inhibiting material to be removed in advance and further the temperature, pressure and composition of the exhaust to be fully examined. The dry process is accompanied with so much complicated operation as to be of little practical use. Moreover, this dry process of adsorbing nitrogen oxides by activated carbon raises a problem with treatment of nitrogen oxides when desorbed from the activated carbon, and often fails to be a resolution.

On the other hand, the wet process, specifically the type which absorbs nitrogen oxides in an alkaline aqueous solution absorbs only a small amount of particularly NO of the nitrogen oxides. Since NO occupies a considerable percentage of general combustion exhaust, the wet process eliminates nitrogen oxides as a whole only at a low rate.

The process of absorbing nitrogen oxides in an acid aqueous solution of urea requires that the ratio of NO to $NO_2$ in plant exhaust be smaller than 1. Since, however, it is extremely difficult to maintain the NO to $NO_2$ ratio at said level, the process is of little practical use.

The process of conducting plant exhaust into an aqueous solution of sulfites or acid sulfites of alkaline metals or alkaline earth metals or a mixture of both types of sulfites and eliminating nitrogen oxides by reaction with the sulfite radical of the solution has the drawback that NO is removed at a low rate. Since $NO_2$ accounts for about 10% of nitrogen oxides in combustion exhaust and NO about 90% thereof, this process fails to be put to industrial application, unless NO is converted into $NO_2$, though the process has the advantage of converting nitrogen oxides into harmless nitrogen gas by reaction with the sulfite radial obtained by desulfurization of plant exhaust.

It is accordingly an object of this invention to provide a method of removing nitrogen oxides from plant exhaust, particularly the NO component at a high rate.

Another object of the invention is to provide a method of simultaneously removing both nitrogen oxides and sulfur oxides such as $SO_2$ and $SO_3$ from plant exhaust.

According to an aspect of the invention there is provided a method of eliminating a nitrogen oxide from an exhaust containing the same which comprises preparing an absorbent solution by adding divalent copper ions alone or a mixture of the divalent copper ions and divalent manganese ions to an acid aqueous solution containing at least one compound selected from the group consisting of sulfites and acid sulfites of ammonium, alkaline metals and alkaline earth metals; and introducing exhaust into the absorbent solution to react the nitrogen oxides of the exhaust with the sulfite radical of the solution, thereby reducing the nitrogen oxides into nitrogen gas.

This invention can be more fully understood from the following detailed description when taken in connection with reference to the accompanying drawings, in which.

Figure 1:
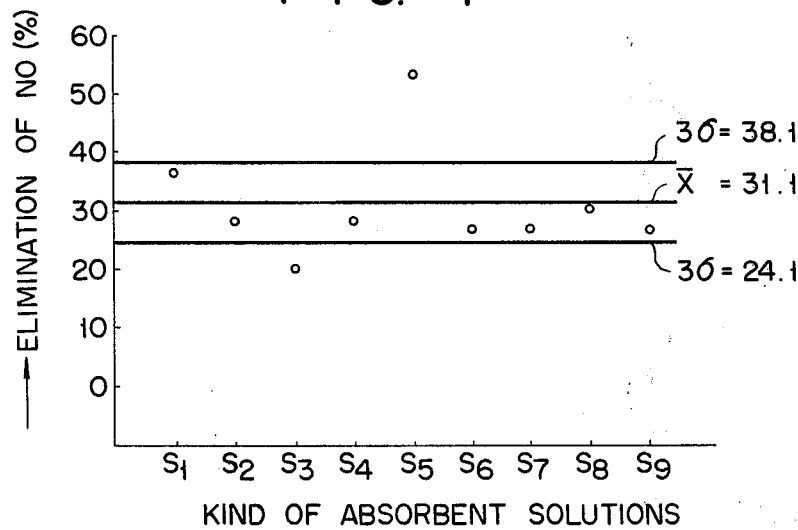
FIG. 1 is a line diagram showing the effect of absorbent solutions containing various catalytic additives on the elimination of NO.

The divalent copper ions used in the method of this invention have been proved to act as a catalyst for reducing nitrogen oxides of an exhaust to nitrogen gas by promoting reaction between the nitrogen oxides and sulfite radical of an absorbent solution. On the other hand, divalent manganese ions serve as a supplementary catalyst and have been found to stabilize the catalytic effect of added divalent copper ions and more efficiently eliminate nitrogen oxides.

This invention will be more fully understood from the laboratory and plant scale tests which follow.

Laboratory Test 1

Tests were made under the following conditions of the effect of ammonium salts of eliminating NO alone and a mixture of NO and $NO_2$ purposely introduced into nitrogen gas using ammonium sulfite and acid ammonium sulfite, but without a catalyst.

The absorbent solution used in the tests consisted of an aqueous solution in which $(NH_4)_2SO_3$ and $NH_4HSO_3$ were dissolved in an equal amount at an overall concentration of 30%. The solution had its pH value controlled to 6.2 by introducing $SO_2$ thereinto. Nitrogen gas containing 550 ppm of NO or a mixture of 500 ppm of NO and 500 ppm of $NO_2$ was conducted at the rate of 250 ml/min. only at the first stage of an atomizer type absorption tester through 500 ml of the absorbent solution at 50°C, thereby determining the capacity of said solution to absorb NO and NO₂. In this case, no catalyst was used, as described above. The results are presented in Table 1 below which shows that NO₂ of the test gas was absorbed at a high rate, whereas NO was removed at a low rate.

Table 1

| Nitrogen oxides in the test gas | Percentage removal of NO (%) | Percentage removal of NO + NO₂ (%) |
|---|---|---|
| NO(550 ppm) | 23 | 23(NO alone) |
| NO(500 ppm) NO₂(500 ppm) | 27 | 47 |

Reaction between nitrogen oxides of plant exhaust and the sulfite radical of the absorbent solution may be expressed by the following reaction formulas:

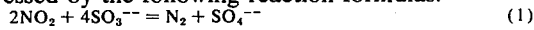  (1)

  (2)

In the above-mentioned Laboratory Test 1, it was found that the reaction of the formula (2) did not proceed completely. The reason is supposed to be that NO had a low solubility or the reaction of the formula (2) was carried out at a slow rate. It was therefore confirmed that the efficient elimination of NO was important for the prominent removal of nitrogen oxides as a whole.

Laboratory Test 2

It may be considered advisable to increase the solubility of NO in an absorbent solution in order to promote the speed of the reaction of the above-mentioned formula (2). Since, however, it was difficult to elevate said solubility, various additives were added to the absorbent solution to accelerate the reaction of the formula (2), and tests were made to determine the catalytic effect of said additives.

In this test, there were provided the same kind of atomizer type absorption tester and absorbent solution as in Laboratory Test 1. However, absorption of nitrogen oxides was effected through the two stages of the tester. In Laboratory Test 2, the undermentioned nine kinds $S_1$ to $S_9$ of absorbent solution were used. $S_9$ was the same kind of absorbent solution as used in Laboratory Test 1. $S_1$ to $S_8$ were the solutions to which the following catalytic materials were added respectively.

$S_1$ = a solution prepared by adding 0.1 percent by weight of sodium naphthaquinone sulfonate to the absorbent solution used in Laboratory Test 1

$S_2$ = a solution prepared by adding 0.1 percent by weight of hydroquinone to said absorbent solution $S_3$ = a solution prepared by adding 0.1 percent by weight of hydroxylamine to said absorbent solution $S_4$ = a solution prepared by adding $Ni^{++}$ in the form of sulfate to said absorbent solution in an amount of 0.1 percent by weight as Ni $S_5$ = a solution prepared by adding $Cu^{++}$ in the form of sulfate to said absorbent solution in an amount of 0.1 percent by weight as Cu $S_6$ = a solution prepared by adding $Co^{++}$ in the form of sulfate to said absorbent solution in an amount of 0.1 percent by weight as Co $S_7$ = a solution prepared by adding $Mn^{++}$ in the form of sulfate to said absorbent solution in an amount of 0.1 percent by weight as Mn $S_8$ = a solution prepared by adding $Fe^{++}$ in the form of sulfite to said absorbent solution in an amount of 0.1 percent by weight as Fe Nitrogen gas containing 221 ppm of NO was caused to be absorbed in the above-mentioned nine absorbent solutions. The results of Laboratory Test 2 are presented in FIG. 1 in which the nine absorbent solutions are plotted on the abscissa and their capacity to remove NO on the ordinate. A standard deviation $\sigma$ was determined from the co-ordinate system according to stochastics, and deviations $3\sigma$ in the percentage removal of NO were calculated from said standard deviation. As apparent from FIG. 1, $S_5$ containing $Cu^{++}$ presented a NO-removing capacity of 55.3% far higher than the $3\sigma$ line, a value substantially twice the NO-removing capacity (27.3%) of $S_9$ which was free from any additive, providing that $C^{++}$ displayed a prominent catalytic effect. In FIG. 1, $\bar{x} = 31.1$ indicates an average value.

Laboratory Test 3

Since $Cu^{++}$ was thus shown to have an excellent catalytic activity to remove NO, a search was made for a supplementary catalyst for $Cu^{++}$. As a result, $Mn^{++}$ was found to have such a capacity. Therefore, tests were made on the effect of varying amounts of $Mn^{++}$ added. Two test gases respectively containing 220 ppm and 550 ppm of NO were prepared by diluting NO with $N_2$ in the same manner as in Laboratory Test 1. Tests were made on the NO-removing capacity of an absorbent solution free from any catalyst and another kind of absorbent solution to which $Cu^{++}$ alone or a mixture of $Cu^{++}$ and $Mn^{++}$ was added as a catalyst, the results being set forth in Table 2 below. Throughout Table 2 and the later described FIG. 2, the character $A_1$ designates $N_2$ gas containing 220 ppm of NO and $A_2$ indicates $N_2$ gas containing 550 ppm of NO. $B_1$ shows the same absorbent solution used in Laboratory Test 1, $B_2$ an absorbent solution to which 0.1 percent by weight of $Cu^{++}$ was added to $B_1$, $B_3$ an absorbent solution to which 0.1 percent by weight of $Cu^{++}$ and 0.05 percent by weight of $Mn^{++}$ were added to $B_1$, and $B_4$ an absorbent solution to which 0.1 percent by weight of $Cu^{++}$ and 0.1 percent by weight of $Mn^{++}$ were added to $B_1$.

Table 2

| Catalyst No ppm | $B_1$ (without catalyst) | $B_2$ ($Cu^{++}$0.1%) | $B_3$ ($Cu^{++}$0.1% $Mn^{++}$0.05%) | $B_4$ ($Cu^{++}$ 0.1% $Mn^{++}$0.1%) |
|---|---|---|---|---|
| $A_1$(220) | (—, —, 23) | (—, —, 59) | (48, 46, 72) | (43, 49, 71) |
|  | (—, —, 27) | (—, —, 55) | (50, 38, 69) | (41, 51, 71) |
| $A_2$(550) | (23, 18, 36) | (46, 32, 64) | (54, 49, 76) | (47, 52, 75) |
|  | (27, 16, 39) | (55, 31, 69) | (55, 39, 73) | (56, 54, 80) |

Notes:
(1) Tests were made at random.
(2) (—, —, —) denote the percentage NO removal at the first and second stages and the overall NO removal as counted from the left. Date analysis was made of a total amount of removal.

The NO removal at each stage of Table 2 was computed as follows:

NO removal at first stage =

$$\frac{\text{NO ppm removed at first state}}{\text{original NO ppm in test gas}} \times 100$$

NO removal at second stage =

$$\frac{\text{NO ppm removed at second stage}}{\substack{\text{Free NO ppm from first stage} \\ \text{still contained in test gas}}} \times 100$$

Overall NO removal =

$$\frac{\substack{\text{Total NO ppm removed at} \\ \text{first and second stages}}}{\substack{\text{NO ppm contained in} \\ \text{entire test gas}}} \times 100$$

Analysis of variance was made of the values of Table 2, the results being presented in Table 3 below. In this Table 3, the character A denotes NO ppm, B four kinds ($B_1$ to $B_4$) of absorbent solution, e errors, and T a total of variations.

Table 3

| Factors | Sum of squares | Φ(degree of freedom) | V(variance) | Fo |
|---|---|---|---|---|
| A | 264.1 | 1 | 264.1 | 38.8** |
| B | 4755.7 | 3 | 1585.2 | 233.1** |
| A × B | 40.6 | 3 | 13.5 | 1.98 |
| e | 54.5 | 8 | 6.8 | — |
| T | 5114.9 | 15 | — | — |

Note:
In Laboratory Test 3, varying amounts of $Mn^{++}$ were used. Under the conditions of said test, manganese had a solubility of 0.006%, so that the excess undissolved amount of manganese indicated a suspended state in the form of hydroxide.
A mark ** is given in the column Fo of Table 3 above. This shows, as is well known, that determination of F (F-test) proved the factors A and B to have a 1% level of significance and were really significant.

Figure 2:
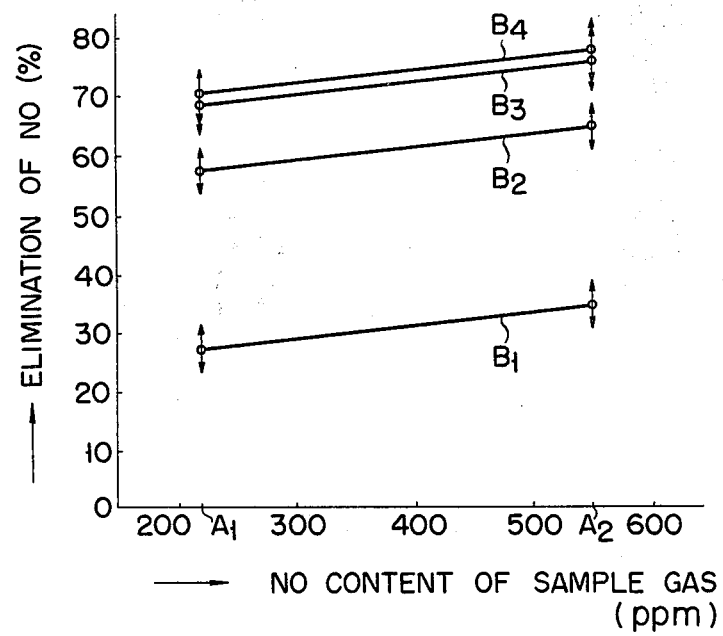
FIG. 2 is a line diagram showing the relationship of NO concentration in an exhaust and the effect of various absorbent solutions on the removal of NO.

As seen from Table 3 and FIG. 2 prepared by presenting the test results of Table 3 in lines, addition of $Cu^{++}$ enabled a larger amount of NO to be removed than when said ion was not used and application of a mixture of $Cu^{++}$ and $Mn^{++}$ attained a far more prominent removal of NO. Further, the elimination of NO was realized at a higher rate in the test gas $A_2$ containing a large amount of NO than in the test gas $A_1$.

Laboratory Test 4

Figure 3:
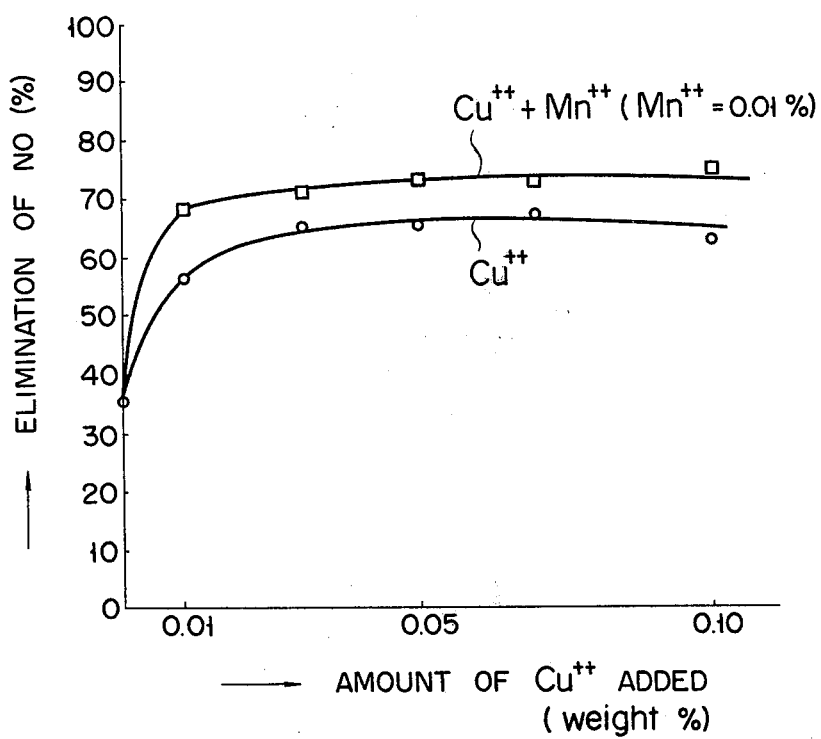
FIG. 3 is a line diagram showing the effect of the amounts and combinations of catalytic additives contained in absorbent solutions on the elimination of NO.

Tests were made of the varying amounts of $Cu^{++}$ and $Mn^{++}$ added to prove their catalytic activity in the elimination of NO. The tests were carried out by causing NO to be removed through the two stages of the absorption tester as in Laboratory Test 3, where $Cu^{++}$ alone was used in varying amounts and also where a mixture of $Cu^{++}$ and $Mn^{++}$ was added in such an amount that the addition of $Mn^{++}$ was fixed at 0.01 percent by weight based on the absorbent solution, whereas the addition of $Cu^{++}$ was changed, the results being set forth in FIG. 3. As apparent from FIG. 3, addition of 0.03 percent by weight of $Cu^{++}$ alone attained a substantially maximum removal of NO. Namely, any further addition of $Cu^{++}$ kept the rate of NO removal almost unchanged, so that application of more than 0.1 percent by weight of said additive was found wasteful. In the case where a mixture of $Cu^{++}$ and $Mn^{++}$ was used, addition of more than 0.01 percent by weight of $Cu^{++}$, with the amount of $Mn^{++}$ fixed at 0.01 percent by weight, displayed a prominent capacity to eliminate NO.

It was confirmed that addition of $Cu^{++}$ alone or a mixture of $Cu^{++}$ and $Mn^{++}$ as a catalyst to an aqueous solution containing sulfites and acid sulfites of ammonium enabled the NO content of plant exhaust to be removed in the form reduced to $N_2$.

Laboratory Test 5

Since the foregoing laboratory tests showed that the presence of the catalytic additives of $Cu^{++}$ or a mixture of $Cu^{++}$ and $Mn^{++}$ in an aqueous solution containing sulfites and acid sulfites of ammonium effectively eliminated NO, tests were also made in the same manner as in Laboratory Test 2 for the NO-removing capacity of an aqueous solution containing sulfites and acid sulfites of alkaline metals or alkaline earth metals to which said $Cu^{++}$ or a mixture of $Cu^{++}$ and $Mn^{++}$ was added, using test gas containing 200 ppm of NO, the results being indicated in Table 4 below.

Table 4

Concentration in ppm of free NO in the test gas after the original NO content therein was partly absorbed in an absorbent solution (values in parenthesis denote the rate of NO removal)

| Composition of absorbent solution | First stage | Second stage | Total |
|---|---|---|---|
| (*1) $Na_2SO_3$ (pH4) $NaHSO_3$ | 172 (14%) | 145 (16%) | 145 (23%) |
| 0.05% of $Cu^{++}$ and 0.01% of $Mn^{++}$ added to the above solution | 127 (37%) | 57 (55%) | 57 (72%) |
| (*2) $CaSO_3$ (pH4) $Ca(HSO_3)_2$ | 159 (21%) | 131 (18%) | 131 (35%) |
| 0.05% of $Cu^{++}$ and 0.01% of $Mn^{++}$ added to the above solution | 92 (54%) | 46 (50%) | 46 (77%) |
| (*3) $MgSO_3$ (pH4) $Mg(HSO_3)_2$ | 163 (19%) | 137 (16%) | 137 (32%) |
| 0.05% of $Cu^{++}$ and 0.01% of $Mn^{++}$ added to the above solution | 105 (48%) | 53 (49%) | 53 (74%) |

Note:
(*1) $SO_2$ was introduced into a 5% aqueous solution consisting of $NaSO_3$ and $NaHSO_3$ to control the pH of said solution to 4.
(*2) $SO_2$ was introduced into a slurry consisting of 2% $CaSO_3$ and 2% $CaSO_4$ to control the pH of said slurry to 4.
(*3) $SO_2$ was conducted into a slurry consisting of 2% $MgSO_3$ and 2% $MgSO_4$ to control the pH of said slurry to 4.

The rate of NO removal shown in Table 4 above was computed by the following method. Description is only given of the column of *1.

200 ppm − 172 ppm = 28 ppm $$\frac{28}{200} \times 100 = 14\% \text{ (first stage)}$$

$$\frac{172 - 145}{172} \times 100 = 16\% \text{ (second stage)}$$

200 ppm − 145 ppm = 55 ppm $$\frac{55}{200} \times 100 = 23\% \text{ (total)}$$

The same method of calculation is applicable to the after columns.

It was proved that when mixed with $Cu^{++}$ or a mixture of $Cu^{++}$ and $Mn^{++}$, an aqueous solution containing the sulfites or acid sulfites of alkaline metals or alkaline earth metals displaced as prominent an effect of eliminating NO as the same aqueous solution of ammonium. The same results were obtained with an aqueous solution of sulfites or acid sulfites of potassium, when the solution contained $Cu^{++}$ or a mixture of $Cu^{++}$ and $Mn^{++}$.

The reason why the pH value of the absorbent solutions was decreased as described in Notes 2 and 3 to Table 4 above is that it was necessary to convert $CaSO_3$ and $MgSO_3$ to a form capable of reacting with nitrogen oxides, and that unless the pH value remained on the acid side, $Cu^{++}$ and $Mn^{++}$ would be precipitated.

Plant Scale Application

Nitrogen oxides contained in exhaust from the sintering plant of iron works were removed by the method of this invention. In this test an atomizer type absorber was used. Exhaust from the sintering plant was conducted through an electric Cottrell dust collector to be stripped of dust. Said exhaust was passed at the rate of 200 ml/min. through 500 ml of the nitrogen oxide-absorbing solution of this invention maintained at 50°C to determine the absorbing capacity of said solution.

Exhaust from the sintering plant contained 7.0% by volume of $CO_2$, 11.0% by volume of $O_2$, 0.5% by volume of CO, 81.5% by volume of $N_2$, 180 ppm of nitrogen oxides, 450 ppm of $SO_2$ and some amounts of water and dust.

The nitrogen oxide-absorbing solution used in the above-mentioned test was prepared by first providing an aqueous solution in which $(NH_4)_2SO_3$ and $NH_4HSO_3$ were dissolved in a total amount of 30 percent by weight, introducing $SO_2$ gas into said aqueous solution to control its pH to 6.2 and further adding catalysts $Cu^{++}$ and $Mn^{++}$ respectively in an amount of 0.01 percent by weight based on said solution. There was also used another type of nitrogen oxide-absorbing solution which did not contain said catalysts. The results of the plant scale tests are presented in Table 5 below.

Table 5

|  | Without catalyst | $Cu^{++}$ and $Mn^{++}$ added in 0.01% respectively |
|---|---|---|
| Content of nitrogen oxides in original plant exhaust | (180 ppm) | (180 ppm) |
| Content of nitrogen oxides in the exhaust passed through the absorbent solution | 120 ppm | 40 ppm |
| Rate of removing nitrogen oxides | 33% | 78% |

Table 5 above clearly shows the prominent effect of divalent copper ions and divalent manganese ions added to the absorbent solution.

For the object of this invention, the catalyst $Cu^{++}$ should preferably be added to an acid aqueous solution containing at least one compound selected from the group consisting of sulfites and acid sulfites of ammonium, alkaline metals and alkaline earth metals in an amount of 0.03 to 0.1 percent by weight as metallic copper. On the other hand a mixture of $Cu^{++}$ and $Mn^{++}$ used as a catalyst should preferably be added to the above-mentioned aqueous solution in such an amount that where addition of $Mn^{++}$ is fixed at 0.01 percent by weight as metallic manganese, $Cu^{++}$ accounts for 0.01 to 0.1 percent by weight.

Exhaust from chemical plants generally contains as large an amount of NO as more than 90%. Where nitrogen oxides are removed by being absorbed in the prior art absorbent solution containing sulfites or acid sulfites of alkaline metals or alkaline earth metals or a mixture of these compounds, NO is eliminated only at a low rate as previously described. For the more efficient removal of nitrogen oxides, therefore, the prior art process requires NO to be converted into $NO_2$ readily absorbable in the absorbent solution and thereafter said $NO_2$ to be removed according to the aforesaid reaction formula (1). In contrast, the method of this invention attains a high rate of removing NO, and can effect said removal directly according to the previously mentioned reaction formula (2). As apparent from comparison between both reaction formulas (1) and (2), consumption of $SO_3^{--}$ in the formula (2) is half that of the formula (1). Therefore, the method of this invention reduces requirements of $SO_3^{--}$ more effectively than has been possible in the past. Further, the method of the invention enables plant exhaust containing both nitrogen oxides and $SOy$ ($y$ is an integer of 2 or 3) to be treated in a single apparatus, offering the economic advantage of utilizing the sulfite radical recovered by desulfurization of an exhaust in reaction with nitrogen oxides.

Where nitrogen oxides and $SOy$ are to be removed simultaneously from an exhaust by a single tower system using the absorbent solution of this invention containing sulfites or acid sulfites of ammonium, then it is advised to control the pH of the absorbent solution to 5.8 to 6.5. Where said simultaneous elimination of nitrogen oxides and $SOy$ is to be effected by a two-tower system, then the absorbent solution of the first tower which is initially brought into contact with plant exhaust should preferably have a pH value of less than 6 and the absorbent of the second tower a pH value of less than 6.5.

Where the above-mentioned simultaneous elimination of nitrogen oxides and $SOy$ from an exhaust using the absorbent solution of this invention containing sulfites or acid sulfites of sodium, potassium, calcium or magnesium is to be effected, then $Cu^{++}$ and $Mn^{++}$ used as catalysts are sometimes undesirably changed into insoluble hydroxides in the pH range adapted for removal of $SO_2$. Where, however, a two-tower system is applied to avoid such drawback, thereby reducing the pH of the absorbent solution of the first tower to a level of less than 6 by the $SO_2$ content of an exhaust, then salts of copper and/or manganese added as catalysts can be rendered soluble, and moreover $CaSO_3$ and $MgSO_3$ can be respectively converted into soluble $Ca(HSO_3)_2$ and $Mg(HSO_3)_2$ capable of reacting with nitrogen oxides.

What we claim is:

1. A method of removing a nitrogen oxide from an exhaust gas containing a nitrogen oxide, which comprises: contacting said gas with an acidic aqueous solution consisting essentially of
- i. a salt selected from the group consisting of ammonium sulfite, ammonium acid sulfite, an alkali metal sulfite, an alkali metal acid sulfite, an alkaline earth metal sulfite, an alkaline earth metal acid sulfite, and a mixture of two or more thereof,
- ii. at least one copper compound forming divalent copper ions therein, the amount of said copper compound in said solution being such that divalent copper ions are produced in an amount of from 0.01 to 0.1 percent by weight in said solution, and
- iii. at least one manganese compound forming divalent manganese ions therein, the amount of said manganese compound being such that divalent manganese ions are produced in an amount of from 0.01 to 0.1 percent by weight in said solution, to reduce said nitrogen oxide to nitrogen gas.

2. The method of claim 1, wherein the amount of the copper compound is such that divalent copper ions are produced in an amount of from 0.03 to 0.1 percent by weight in said solution.

3. The method of claim 1, wherein the nitrogen oxide is nitrogen monoxide.

4. The method of claim 1, wherein the nitrogen oxide is nitrogen dioxide.

5. A method of removing a nitrogen oxide and a sulfur oxide from an exhaust gas containing the same, which comprises:
contacting said gas with an acidic aqueous solution having a pH of from 5.8 to 6.5 and consisting essentially of
- i. a salt selected from the group consisting of ammonium sulfite, ammonium acid sulfite, an alkali metal sulfite, an alkali metal acid sulfite, an alkaline earth metal sulfite, an alkaline earth metal acid sulfite, and a mixture of two or more thereof,
- ii. at least one copper compound forming divalent copper ions therein, the amount of said copper compound in said solution being such that divalent copper ions are produced in an amount of from 0.01 to 0.1 percent by weight in said solution, and
- iii. at least one manganese compound forming divalent manganese ions therein, the amount of said manganese compound being such that divalent manganese ions are produced in an amount of from 0.01 to 0.1 percent by weight in said solution, to reduce said nitrogen oxide to nitrogen gas.

6. The method of claim 5, wherein the amount of the copper compound is such that divalent copper ions are produced in an amount of from 0.03 to 0.1 percent by weight in said solution.

7. The method of claim 5, wherein the nitrogen oxide is nitrogen monoxide.

8. The method of claim 7, wherein said gas is contacted with a first said acidic aqueous solution having a pH of less than 6, and is then contacted with a second said acidic aqueous solution having a pH of less than 6.5.

9. The method of claim 5, wherein the nitrogen oxide is nitrogen dioxide.

* * * * *

UNITED STATES PATENT AND TRADEMARK OFFICE
CERTIFICATE OF CORRECTION

PATENT NO. : 3,932,585
DATED : January 13, 1976
INVENTOR(S) : SANSEKI MORIGUCHI ET AL It is certified that error appears in the above-identified patent and that said Letters Patent are hereby corrected as shown below:

Column 2, line 7: replace "radial" with -- radical --.

Columns 3-4, Table 2: in the heading under "Catalyst", rewrite "No" as --- NO ---.

Column 6, Table 4: in the heading, rewrite "parenthesis" as --- parentheses ---.

Column 10, Claim 8, line 1: replace "7" with --- 5 ---.

Signed and Sealed this

Tenth Day of August 1976

[SEAL]

Attest:

RUTH C. MASON
*Attesting Officer*

C. MARSHALL DANN
*Commissioner of Patents and Trademarks*